United States Patent [19]

Erat

[11] Patent Number: 4,590,61

[45] Date of Patent: May 20, 198

[54] DIPOLE ANTENNA FOR PORTABLE RADIO

[75] Inventor: August Erat, Berlin, Fed. Rep. of Germany

[73] Assignee: Robert Bosch GmbH, Stuttgart, Fed. Rep. of Germany

[21] Appl. No.: 571,078

[22] Filed: Jan. 16, 1984

[30] Foreign Application Priority Data

Jan. 28, 1983 [DE] Fed. Rep. of Germany ....... 3302876

[51] Int. Cl.[4] .......................... H04B 1/08; H01Q 1/24

[52] U.S. Cl. .................................... 455/270; 455/349; 455/351; 455/193; 343/702; 343/793; 343/873

[58] Field of Search ............... 455/269, 270, 349, 351, 455/90, 193, 128; 343/702, 793, 873, 794, 795

[56] References Cited

U.S. PATENT DOCUMENTS

| | | | |
|---|---|---|---|
| 2,828,413 | 3/1958 | Bowers | 455/269 |
| 3,573,628 | 4/1971 | Cramer, Jr. et al. | 343/702 |
| 4,344,184 | 8/1982 | Edwards | 455/128 |
| 4,471,493 | 9/1984 | Schober | 455/90 |
| 4,491,843 | 1/1985 | Boubouleix | 343/70 |

FOREIGN PATENT DOCUMENTS 1933150 8/1970 Fed. Rep. of Germany .

*Primary Examiner*—Jin F. Ng

*Attorney, Agent, or Firm*—Frishauf, Holtz, Goodman & Woodward

[57] ABSTRACT

A dipole antenna for a portable radio is contained completely within the insulated housing (10) of the transceiver. The dipole antenna is formed as two conductive surfaces (12, 13) electrically isolated from each other but disposed on the same printed circuit board (11) of the transceiver circuit which supports the circuit modules (14, 15). The two dipole halves are connected to each other by means of a dipole tuning circuit (29). The conductive tracks (23, 26, 27) of the transceiver circuit are interrupted at a location which divides as few tracks as possible. The interrupted tracks are bridged together by high-impedance resistors (22).

7 Claims, 3 Drawing Figures

DIPOLE ANTENNA FOR PORTABLE RADIO

The present invention relates generally to dipole antennas for portable radios, and more particularly to an improved built-in antenna which does not project beyond the normal dimensions of the radio housing.

BACKGROUND

There is disclosed in U.S. Pat. No. 3,573,682, which corresponds to German Patent Disclosure Document DE-OS No. 19 33 150, a dipole antenna for a portable radio which incorporates a conductive housing, part of which forms the antenna, and which has a circuit arrangement which constricts the space available for other electrical components. Such a construction has the disadvantage that contact with the body or with even more conductive surfaces may affect the functioning of the circuit.

THE INVENTION

The antenna of the present invention avoids this and other disadvantages by using internal components of the radio to form the dipole.

Briefly, a central non-conductive strip separates the surface of the component mounting board of the radio into two conductive surfaces, each of which forms one of the antenna dipoles, and on each of which are mounted components of the radio circuit. The distribution of these components is chosen such that the non-conductive center strip interrupts as few conductive tracks of the printed circuit as possible.

DRAWINGS

DETAILED DESCRIPTION

Figure 1:
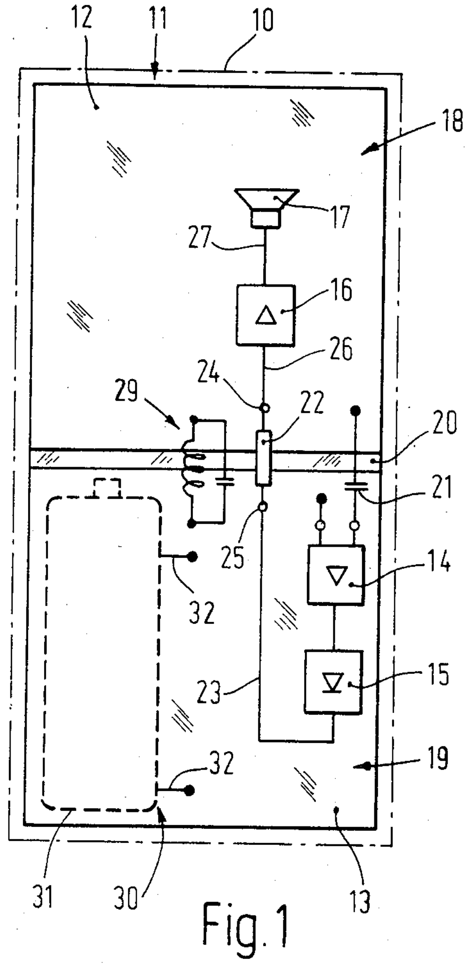
FIG. 1 is a schematic illustration of a radio dipole antenna in accordance with the invention.

In FIG. 1, a dashed and dotted line indicates an insulated housing 10 of a radio which can, for example, be carried in the hand or elsewhere on the body. The housing includes a printed circuit board 11, i.e. a copper-coated insulated board with conductive tracks and conductive surfaces 12, 13, as well as various stages and elements of the radio. Individually disposed on the printed circuit board 11 are a high-frequency amplifier 14, a demodulator 15, a low-frequency amplifier 16, and, if necessary, a loudspeaker 17.

Figure 3:
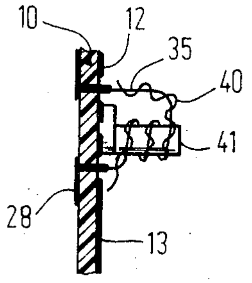
FIG. 3 is an enlarged cross-sectional view of a printed circuit board with a coil belonging to a dipole tuning circuit.

Two dipole halves 18, 19 electrically isolated from each other serve as the antenna. They comprise conductive surfaces 12, 13 separated by a non-conductive strip 20. In the preferred embodiment shown, conductive surfaces 12, 13 are essentially rectangular metallic coatings covering substantially all the upper and lower halves, respectively, of one face of an elongated rectangular circuit board of insulating material. It will be readily apparent to those skilled in the art that numerous variations are possible. The surfaces 12, 13 are preferably shielding surfaces connected to the modules and components, i.e. circuits 14, 15, 16 and loudspeaker 17 disposed in the area of the surfaces 12, 13, as well as to the conductive tracks 28 which may be provided on the reverse side of the printed circuit board (FIG. 3). Shielding housings, which may be provided for the modules, would contribute to the formation of the dipole halves.

The upper conductive surface 12 of the first dipole half 18 is connected by means of a coupling capacitor 2 with a first input of the high-frequency amplifier 14 whose second input is connected directly to the potential of the lower conductive surface 13.

Aside from the electrical division of the conductive surfaces 12 and 13, an electrical division of the radio circuit is also necessary. This division may, for example be accomplished between the output of the demodulator 15 and the input of the low-frequency amplifier 16 as shown in FIG. 1, i.e. when the high-frequency amplifier 14 and the demodulator 15 are disposed in the surface 13 region of the circuit board and the low-frequency amplifier 16 and loudspeaker 17 are disposed in the surface 12 region of the board. An electrical bridge is formed by a high-impedance resistor 22. In FIG. 1 the electrical division of the circuit 23 between demodulator 15 and low-frequency amplifier 16 is symbolically indicated by contacts 24, 25.

The conductor 23 between demodulator 15 and contact 25 adjacent resistance 22, like other conductors for example conductors 26, 27, is preferably formed as a track on the reverse side of the printed circuit board, on which all tracks which cross the area of strip 20 are interrupted and bridged with high-impedance resistors.

A dipole tuning circuit 29, for example a parallel resonant circuit, electrically connects the two conductive surfaces 12, 13. In FIG. 1, the dashed lines indicate the outlines of a battery 30, whose metallic housing 31 is connected by a lead 32 with the conductive surface 13, so that the battery housing forms a part of the lower dipole half 19.

Figure 2:
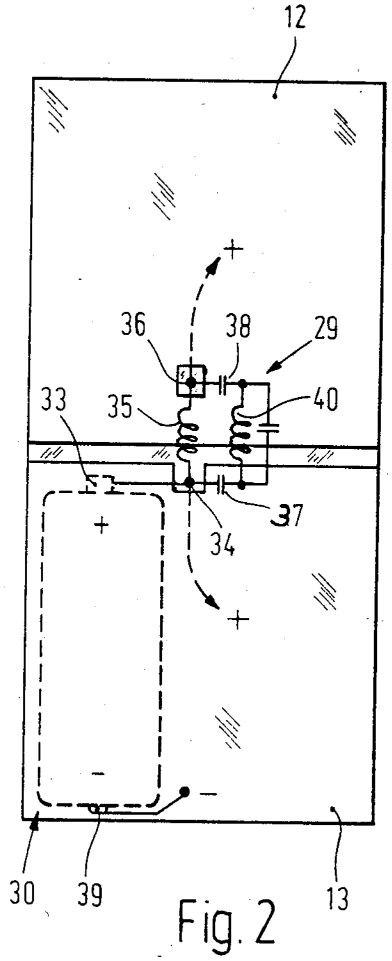
FIG. 2 is a schematic illustration of the d-c power supply for the radio construction of FIG. 1.

As shown in FIG. 2, the electric power supply for the modules preferably includes connecting the positive pole 33 of the battery 30 with a first soldering terminal 34 which is isolated from the two conductive surfaces 12, 13. A coil 35 connects the first soldering terminal 34 with a second soldering terminal 36 surrounded by, but isolated from, the conductive surface 12. The first solder terminal 34 is connected by means of a first capacitor 37 with the conductive surface 13, and the second solder terminal 36 is similarly connected by a second capacitor 38 with the surface 12. The positive potential for the part of the circuit disposed in the region of the conductive surface 13 is collected at the first solder terminal 34 and the positive potential for the part of the circuit disposed in the region of the conductive surface 12 is collected at the second solder terminal 36. The minus pole 39 of the battery 30 is connected directly to the conductive surface 13. The conductive surface 12 is connected to the negative potential through a coil 40 of the dipole tuning circuit 29. The coils 35, 40 can be commonly disposed on a coil core 41 fastened on the circuit board.

It can be advantageous under certain circumstances to wind the two coils as a double-wound coil. The double-wound coil provides a satisfactory separation of the direct-current circuit and the high-frequency circuit.

I claim:

1. A dipole antenna for a portable radio comprising an insulated housing, in which is disposed a printed circuit board supporting high-frequency (14,15) and low-frequency (16,17) elements, said circuit board having conductive tracks and conductive surfaces thereon, the conductive tracks and surfaces (12,13) as well as the high-frequency and low-frequency elements (14, 15, 16) are located on two separate regions of said circuit board, electrically isolated and divided from each other, each forming a dipole half (18,19), a dipole tuning circuit (29) for electrically connecting the conductive surfaces of the dipole halves (18,19), and high-impedance resistance means (22) for connecting the high-frequency elements (14,15) on one region (13) with the low-frequency elements (16,17) on the other region (12).

2. The dipole antenna of claim 1, wherein the electrical division between the two dipole halves (18, 19) is selected such that a minimum of conductive tracks are interrupted.

3. The dipole antenna of claim 1, wherein the high-frequency elements include a demodulator (15) and the low-frequency elements include a low-frequency amplifier (16); and said electrical division is between the output of the demodulator (15) and the input of the low-frequency amplifier (16).

4. The dipole antenna of claim 1, wherein a positive terminal (33) of a battery (30) is connected with a first solder terminal (34) isolated from, but disposed within, a first dipole half (19) which is connected by means of a coil (35) with a second solder terminal (36) disposed within, but isolated from, a second dipole half (18), and in which the negative terminal (39) of the battery is connected directly to a conductive surface (13) of said first dipole half (19), and with a conductive surface (12) of the other dipole half (18) by means of a second coil (40) of the dipole tuning circuit.

5. The dipole antenna of claim 4, wherein said coil (35) between said solder terminals (34, 36) and said second coil (40) of said tuning circuit (29) are formed as a single double-wound coil.

6. The antenna of claim 1, wherein said printed circuit board comprises an insulating substrate bearing said conductive surfaces on one face thereof and conductive tracks on its other face for connecting said high-frequency and low-frequency elements.

7. The dipole antenna of claim 1, wherein some of said high-frequency and low-frequency elements have shielding housings which contribute to the formation of said dipole halves (18,19).

* * * * *